July 19, 1955  A. CONSTANT  2,713,534
APPARATUS FOR FERTILIZER MANUFACTURE
Original Filed May 14, 1947  4 Sheets-Sheet 1
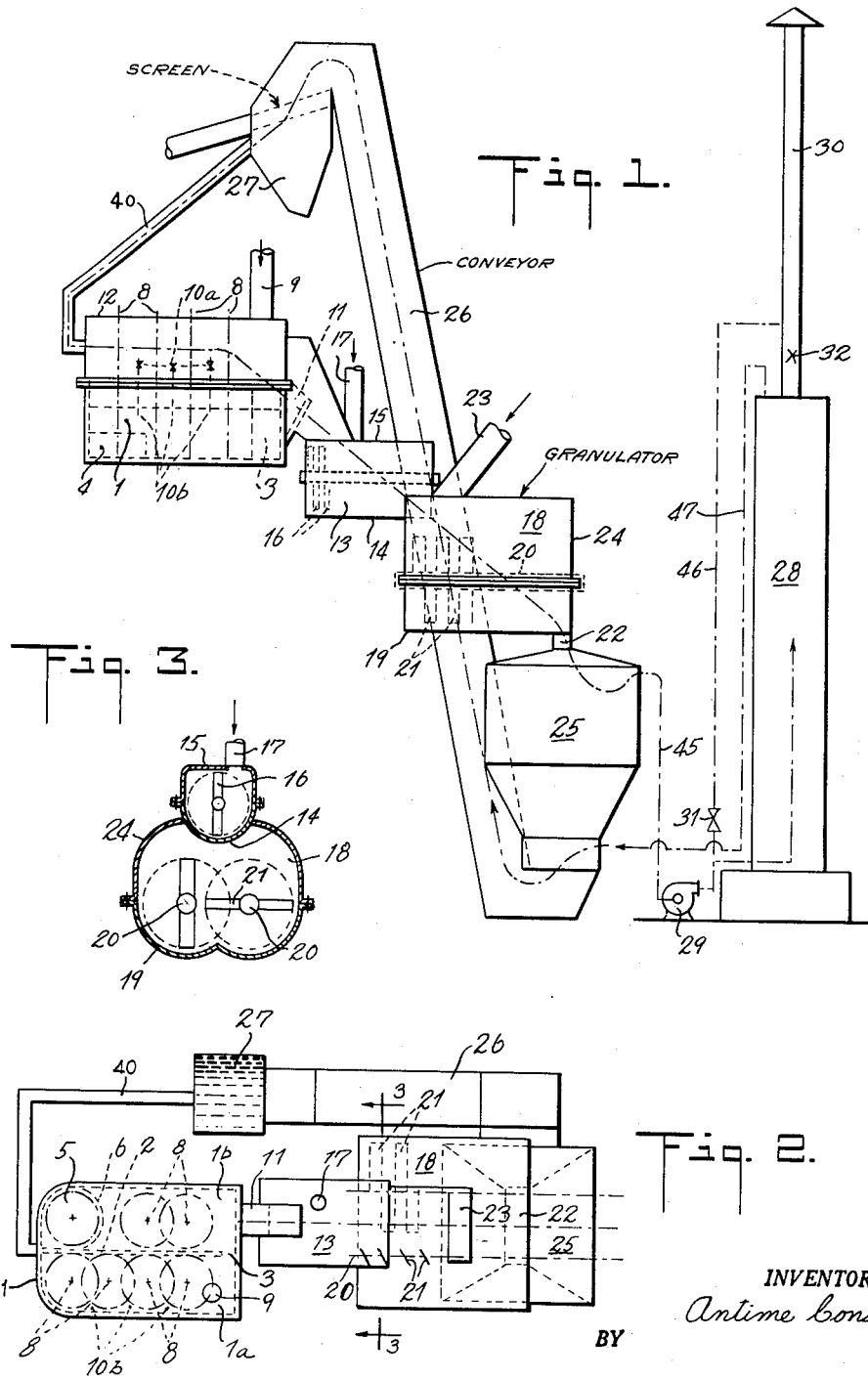
INVENTOR.
Antime Constant
BY
Dale A. Bauer
ATTORNEY

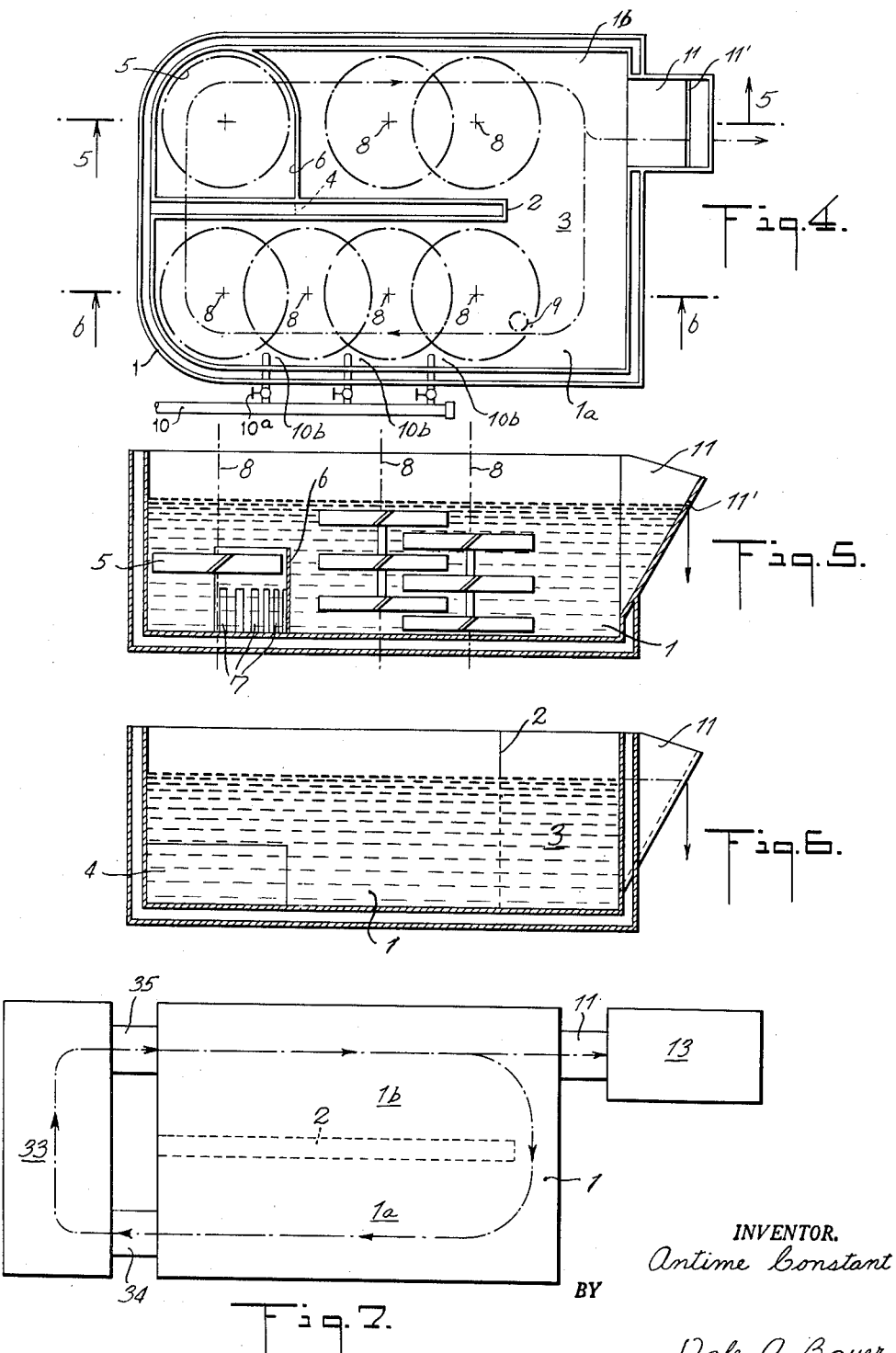

INVENTOR.
Antime Constant
BY
Dale A. Bauer
ATTORNEY.

July 19, 1955  A. CONSTANT  2,713,534
APPARATUS FOR FERTILIZER MANUFACTURE
Original Filed May 14, 1947  4 Sheets-Sheet 4

INVENTOR.
Antime Constant
BY
Dale A. Bauer
ATTORNEY.

United States Patent Office 2,713,534
Patented July 19, 1955

2,713,534

APPARATUS FOR FERTILIZER MANUFACTURE

Antime Constant, Paris, France, assignor to Societe Anonyme des Manufactures des Glaces et Produits Chimiques de Saint-Gobain, Chauny & Cirey, Paris, France Original application May 14, 1947, Serial No. 748,010, now Patent No. 2,635,955, dated April 21, 1953. Divided and this application March 29, 1949, Serial No. 84,030

13 Claims. (Cl. 23—259.3)

This invention relates to the production of fertilizers by the reaction of nitric acid upon phosphatic raw material, or by the reaction upon such material of a mixture of acids in which nitric acid is present.

In proceeding with this specification it will be necessary to describe certain processes that are known to the inventor, but it is not to be assumed that the description of any such process is an acknowledgment that such processes constitute a part of the prior art, or that such processes anticipate this invention. Consequently, it is to be understood that the description of processes not forming a part of this invention is without anticipatory effect.

It has been proposed to react nitric acid with a phosphatic raw material to produce a mixture of phosphoric acid and calcium nitrate and to react that mixture with more phosphatic raw material to produce a phosphonitrate which contains mono-calcium-phosphate and calcium nitrate, and which gels quickly to putty-like consistency that must be worked up mechanically with a vast expenditure of power to produce a granular fertilizer suitable for spreading. In a prior application of this inventor, Ser. No. 645,246, now abandoned, there is disclosed a process wherein certain material difficulties arising during the reaction of nitric acid with phosphatic raw material are ameliorated. This invention constitutes an improvement over that invention and a material advance in the overall process of producing a granular phospho-nitrate fertilizer. The invention includes conceptions in process, conceptions in manipulation, conceptions in apparatus, and conceptions in combinations.

One of the difficulties of the known processes of producing phosphatic fertilizer by reaction with nitric acid is that very concentrated nitric acid cannot be used, although it would be in the highest degree advantageous if very concentrated nitric acid could be employed. Thus, the applicant's prior application describes the method by which acids of 70% concentration may be used. It is an object of this invention to so improve the process that nitric acid of 90%, or higher, concentration may be satisfactorily used in the reaction.

Another object of this invention is to carry out the reaction between nitric acid, even of high concentration, and phosphatic raw material so that uniform and relatively low temperature may be retained easily throughout the reacting mass, thus preventing loss of nitrogen in the form of nitrous or nitric vapors.

In the known processes the attack of nitric acid upon the phosphate released fluorine compounds that rapidly attacked the material of which the reaction apparatus was made, requiring the installation of special and expensive types of apparatus, frequent repairs and replacements, and excessive labor costs. It is an object of this invention to prevent the evolution of fluorine compounds that might corrode the equipment.

It is another object of the invention to increase the yield of fertilizer from given quantities of raw material from apparatus of given volume and unit.

In the known processes nitrogenous gases having potential value as fertilizer constituents were lost by entrainment with other gases released by the reaction and escaping from the reaction mass. It is an object of this invention to prevent such losses.

The process of my said prior application involves the reaction of nitric acid and phosphatic raw material within a considerable mass of products resulting from the similar previous reaction by which definite advantages are obtained. It is an object of this invention to improve that conception by carrying out a sequence of reactions upon said phosphatic raw material, with different reactants, while within the said considerable mass of products resulting from the previous reaction in order to further reduce the temperature rise and the nitrogen losses occasioned during the reaction.

A further object of the invention depends upon my discovery of a process whereby phospho-nitrates may be solidified without becoming putty-like, and this object is to granulate phospho-nitrates by direct hardening whereby puttying is prevented. The accomplishment of this object results in the saving of material sums heretofore expended for the mechanical working up of the putty.

Another object of the invention is to employ a superphosphate as a phosphatic raw material for an attack by nitric acid.

Another object of the invention is to replace all or part of the nitric acid by a mixture of nitrogen oxides and oxygen.

Further objects of the invention are accomplished by the apparatus which is employed in the process and will presently be described.

The objects of the invention are accomplished, generally speaking, by a process having several basic and several coordinate steps. In one of these steps, which may be considered first for the purposes of this disclosure, phosphatic raw material is reacted with nitric acid within a body of the reaction product, the nitric acid being added to the said body later in time or place than the raw material. In a step of the process that may be regarded as second, the product produced by the said first step is reacted with additional raw material. In a step which may be regarded as third, the product produced in the second step is solidified and granulated before it becomes putty-like.

The phosphatic raw materials that may be treated by the process according to the invention include, inter alia, natural phosphates such as Floride, Morocco, and Kouif phosphates, which are generally carbonated, calcined phosphates, phosphates treated by flotation, mono- and di-calcium phosphate, and dephosphoration slag. The nitric acid will be described in the specification, usually, as the sole acid used for reaction with the phosphatic substances, although it must be understood that the invention also includes the use of other acids with nitric acid. The nitric acid may be highly concentrated, even more than 90% by weight $HNO_3$, and even in that case so superior is the invention that loss of nitrogen oxide gases is negligible. The use of such concentrated acid economically produces a mixture of phosphoric acid and calcium nitrate that may be used for the production of fertilizers having a lower water content and particularly good resistance to moisture.

The further description of the processes will be carried out in conjunction with the drawings, wherein, Fig. 1 is a diagrammatic vertical elevation of an apparatus constructed in accordance with the principles of the invention;

Fig. 2 is a diagrammatic plan view of the apparatus shown in Fig. 1;

Fig. 3 is a section in the line 3—3 of Fig. 2;

Fig. 4 is an enlarged plan view of the first reaction vessel;

Fig. 5 is a vertical section on the line 5—5 of Fig. 4;

Fig. 6 is a vertical section on the line 6—6 of Fig. 4 in which stirrers are not shown;

Fig. 7 is a diagrammatic plan view of a modified form of apparatus;

Figure 8:
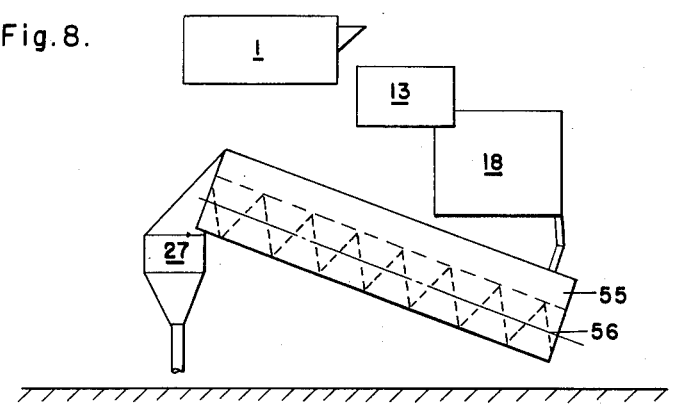
Fig. 8 is a diagrammatic elevational view of a modified form of apparatus.

In the drawings numeral 1 refers to a vat or tank having a longitudinally aligned separating wall 2 that is affixed to the wall of the tank at one end, but is spaced from the opposite end as indicated at 3. At the lower corner of this wall there is an opening 4 that permits communication between the portions 1a and 1b of the tank at the end opposite the discharge. A baffle 6 extends from the outer wall of the tank to the dividing wall 2 forming a kind of well in one corner of the vat. Louvers 7 in the bottom of the baffle can be closed by a gate having cooperating louvers or opened to any desired degree so as to permit communication from the discharge side of the vat to the well and communication between the well and the other side of the vat through the opening 4. The wall 2 extends the full height of the vat and above the level of the fluids in the vat, but the barrier 6 is of less height than the depth of the fluid. Within the well formed by the barrier 6 is a propeller 5 that is rotated by a motor, not shown. This propeller draws materials within the well through the opening 4, and through the louvers 7 if they are open, and lifts them over the barrier 6 so that they flow into the discharge portion 1b of the vat. A circulation and vigorous intermixing and stirring of the fluid mass is therefore simultaneously accomplished. A continual circulation of the liquid begins at the well and proceeds around the vat in the direction shown by the arrows in the dot and dash line of Fig. 4. In addition, there is also provided in the vat, at selected points, a series of stirrers 8 with overlapping blades which insure the uniform mixing and reaction of all parts of the reaction mass. These stirrers may be similarly or oppositely pitched and similarly or oppositely rotated, as desired. Preferably, they are similarly pitched and are similarly rotated, in a same portion 1a or 1b of the vat, so as to provide the maximum stirring. All blades of the stirrers are preferably similarly pitched.

The vat is provided with a double wall as shown in Fig. 4 through which a cooling fluid may be circulated. The partition 2' is hollow to permit circulation of the cooling fluid into proximity to the material in the middle of the vat. A section 11 of the wall of the vat extends outwardly and is provided with a slot 11' below the top thereof that allows the fluid to escape from the vat and maintains the level of the mixture therein.

A removable cover 12 seals the vat (Fig. 1). The cover is provided with an inlet pipe 9 through which phosphatic raw material, or other reactants, may be admitted to the closed vat. This pipe is located near the corner of the vat most remote from the circulator 5. A pipe 10 admits the nitric acid to a horizontal pipe arranged on the outside of the vat, having a plurality of openings 10b that may be closed or opened as desired by the valves 10a. These openings are placed downstream of the solids admissions port 9. When the valve nearest the point of admission 9 is open a comparatively short time passes between the admission of the solids and the reaction with the nitric acid. A longer time elapses if only the second port is open and a still longer time if only the third port is open, and so forth.

In operating the vat 1 the phosphatic raw material and nitric acid are admitted until a substantial body of mixed phosphoric acid and calcium nitrate is formed in the vat. The fluid mixture that is obtained by the reaction mainly comprises free and partially suspended, and in addition water, suspended phosphatic gangue, and if the reaction is made with sulfuric acid as well as nitric acid, calcium sulfate partly dissolved and partly suspended. That mixture is usually referred to as a mixture of fluid phosphoric acid and calcium nitrate and constitutes the product which is produced in vat 1. At an appropriate time the mixers and the propeller in the wall are started so that the fluid mixture circulates. Into this fluid mixture falls phosphatic raw material, in a more or less finely divided state, which reacts with the bath before reacting with the nitric acid. It thus undergoes a two-step reaction, the first of which may be regarded, for convenience, mainly as a reaction between phosphoric acid and raw phosphate, and the second of which may be regarded, mainly as a reaction between mono-calcium-phosphate and nitric acid. By the time this mixture has been circulated through the well to what is termed the discharge side of the vat, the reaction is substantially complete so that only the completed product of this vat, mainly composed of phosphoric acid and calcium nitrate, reaches and flows through the overflow 11' into the next vat.

Under these conditions, operating in a vat provided with a water cooled double wall and stirrers such as have been described, the temperature may easily be maintained at 35 degrees C. or slightly below 35 degrees C. and the mass circulating in the channel may be limited, for standard continuous production, to a portion of 1 to 4 times the weight of the product yielded in one hour. Even when using the highly concentrated nitric acid all points of the reacting mass may be maintained at a temperature that is low enough to practically prevent the loss of nitrogen in the form of nitric or nitrous vapors and also to prevent the evolution of fluorine compounds that might corrode the equipment. Furthermore, the yield obtained is higher than that producible by known processes in apparatus of equal volume. Furthermore, the greatest part of the decarbonatation of the phosphatic substances occurs before the reaction with the nitric acid so that the entrainment of nitric or nitrous vapors with the escaping carbon dioxide is prevented.

The process may also be carried out as a discontinuous, or batch, process. Under such circumstances a substantial body of the reaction product is built up and the phosphatic raw materials and the nitric acid are fed thereto successively so that the phosphate has an opportunity to react with the bath before it is attacked by the nitric acid.

In both continuous and discontinuous operation, the reaction is dissociated into successive phases, in the first of which the phosphatic raw material reacts with the bath containing phosphoric acid yielding as its main product mono-calcium-phosphate, which thereafter reacts with nitric acid which liberates the phosphoric acid that was originally present in the reaction body and that which was combined in the phosphatic raw material.

In a modified form of the invention the nitric acid may be desirably associated with sulfuric acid in the attack upon the phosphate. In this reaction there is a certain amount of calcium sulfate formed which coats the granules, when the fluid mixture is used in the production of granular fertilizers, and enables them better to resist moisture. This phase of the invention is preferably carried out by reacting the phosphatic raw material first with sulfuric acid to form a super-phosphate which is standard, or incompletely solubilized, but from which the greatest part of the carbon dioxide has been eliminated. The super-phosphate is then supplied to the vat through opening 9 in place of other phosphatic raw material, or simultaneously with such raw material. Such super-phosphates are substantially free of carbon dioxide and also of fluorine compounds; during the reaction with nitric acid they exhibit a much reduced exothermic character.

The concentration of sulfuric acid and of nitric acid used is interdependent because it is advisable for the purpose of controlling the behavior of the fertilizer toward moisture to have a final fertilizer containing less than four water molecules for each calcium nitrate molecule. Consequently, if a nitric acid of average concentration is used, the super-phosphate must be prepared with a sulfuric acid stronger than that usually employed in the technique of super-phosphate production. On the other hand, if in accordance with the preferred process of this invention, a highly concentrated nitric acid is employed, a super-phosphate from standard production may be used.

Some exemplary correlated concentrations are shown in Example III.

In a further modification of the invention the nitric acid or a part of it may be replaced by a mixture of oxygen, air and nitrogen oxide. A common source of such a mixture is from the oxidation of nitrogen by the electric arc, and another common source is from the catalytic oxidation of ammonia. Heretofore, attempts have been made to use such gaseous mixtures directly, upon the theory that thereby they saved the cost of manufacturing the nitric acid, which was to be formed in situ during the reaction with the phosphate; but difficulties arose from too-slow an absorption of such mixtures so that dilute liquor was required. When the gaseous mixture is injected into the conveyed fluid mass of the continuous process described above, preferably being injected therein at the point where the mass contains mono-calcium-phosphate, the absorption is very quick and complete and the objections to the gas process as applied to the known process are overcome. The mono-calcium-phosphate immediately reacts with the nitrogen oxides and when and as it is transformed into phosphoric acids, it is renewed, owing to its continuous circulation. The gaseous process is by this invention made satisfactory on an industrial basis where previously it was not wholly so.

The products produced by the new process may be of widely different constitution, of which the following types are exemplary. These types are very useful and certain of the specific examples explain the application of the invention to their manufacture.

The first type is made by the attack of nitric acid alone on raw phosphates and constitutes a fertilizer relatively rich in nitrate nitrogen, such as that called by this assignee 7.5–15 because it contains 7.5% nitrate nitrogen and 15% soluble $P_2O_5$.

The second type is produced by the action of nitric and sulfuric acids upon raw phosphates and is less rich in nitrate nitrogen than the first type, yielding for example the product called 4–16 because it contains 4% nitrate nitrogen and 16% soluble $P_2O_5$. In this method of attack by both nitric and sulfuric acids it is preferable to carry out the sulfuric reaction apart from the nitrate reaction by first forming a superphosphate that is afterwards submitted to attack by nitric acid.

The third type differs from types one and two in that they are binaries containing nitrate nitrogen and phosphoric acid, whereas this is a ternary produced by adding to the binaries of types one and two, in the course of their making, new fertilizer elements such as K, $NH_4$ and the like. For instance, one may add to phospho-nitrate 4–16 in the course of its manufacture, potassium sulfate, ammonium sulfate, or other fertilizer material, thus obtaining compositions of very varied nature.

The conceptions that have been described constitute in themselves an invention, and they are also a part of a larger process for the production of fertilizers which is also novel. In the second step of this larger process, of which that already described forms a part, the overflow from the first vat passes to a second vat 13 in which is a rotary stirrer 16 having blades that move the mass from the inlet which receives the overflow from discharge element 11 of vat 1 to an output at the other end from which the material is dropped into a granulator 19. The vat 13 has supply pipe 17 which is admitted through the cover 15. As the overflow, largely composed of calcium nitrate and phosphoric acid, falls into the vat 13, it is mixed with additional finely divided phosphatic raw material which enters through pipe 17. This material reacts with the mixture to form mono-calcium-phosphate and produce a substance which is usually called phospho-nitrate in the art. The transference of the reactants through the vat 13 is controlled at such a rate that the material falls into the granulator before getting a putty-like consistency. This is quite important because a main objection to the known phospho-nitrate process was the formation of a gel or putty. It is my discovery that the formation of the putty may be prevented if the phospho-nitrate is solidified from the fluid state suddenly as soon as the phospho-nitrate is formed. This solidification must be carried out within a few minutes from the admission of the reactants to the chamber 13. During those few minutes the reaction must be accomplished and while the mass is in the fluid state it must be solidified.

One method of solidification is indicated in the drawing wherein 18 indicates a granulator comprising a vat 19 having two rotary shafts 20, 20 carrying propeller blades 21, which act to toss and break up the phospho-nitrate. The material that falls from the vat 13 into the vat 19 is still fluid and is admixed with finely divided parts of the ultimate product. This finely divided fertilizer acts as a seeding agent and produces a sudden solidification of the phospho-nitrate which is thus solidified without becoming a putty. The granulated product is discharged from the granulator through a pipe 22 to a storage pit 25 where it may be aged and from which portions thereof may be extracted for employment in the process as desired. The vat 19 is covered with a cover 24 as indicated.

Figure 13:
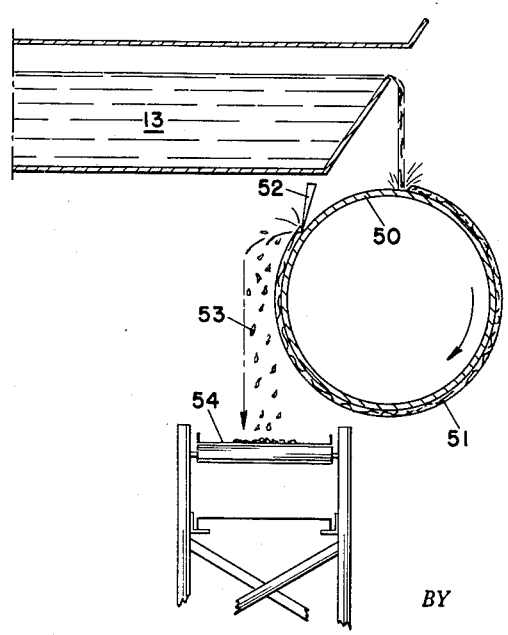
Fig. 13 is a diagram of a modified granulator.

Instead of using the granulator 18 shown in Fig. 1 of the drawing, the fluid mixture of phosphoric acid and calcium nitrate can be spread in a thin layer over a cooled surface, as shown in Fig. 13, for instance over a rotating internally cooled drum 50, from which the solidified phospho-nitrate 51 is scraped by a doctor blade 52 which usually produces a sufficient division. The fragments 53 fall upon a belt conveyor 54, in the form of the drawing. In either case this process eliminates the greater part of all the power that was previously required to work up and granulate the putty.

It is advantageous to extend the time during which the mass remains fluid so that there is provided efficient contact of the free phosphoric acid with the phosphatic raw material before solidification. This may be accomplished by leaving a little nitric acid in the free state in the mixture of phosphoric acid and calcium nitrate that flows into the reactor 13.

The first main step of the process is in true combination with the steps that follow particularly because of the low temperature at which the mixture is obtained, because of which it can be used immediately for reaction with phosphatic raw material. This obtaining of a low temperature can be further facilitated by putting back into the mixture of phosphoric acid and calcium nitrate, during its manufacture in vat 1, wasted scraps of the finished product. This is facilitated by the apparatus shown in Fig. 1 wherein the product from the base of storage tank 25 is carried through a conveyor 26 to a screen 27 from which the very finest particles are withdrawn and sent through tube 9 to the end of the vat. The scraps not only absorb heat because of the difference in temperature, but dissolve in the reaction mass and absorb heat by change of phase.

The screen 27 not only removes the finest particles for the benefit of the reaction in tank 1, but removes the coarsest particles for further granulation or further processing so that the part discharged is of relatively uniform size.

The process according to the invention may also be used for the production of other compound fertilizers, the complementary elements being introduced in the circuit of the treated material at points which may vary according to the nature of these materials. Potassium sulfate may thus be added; such elements will be supplied, for instance, at the same time as the phosphatic materials subjected to the reaction of phosphoric acid and calcium nitrate in the vat 1. It can also be supplied in the vat 13 or in the granulator 18. In the case of ammonium sulfate, this substance may be added to the granulator.

The granulator 18 is made of ordinary steel and its stirring action is sufficiently strong to crumble and granulate the material and to throw the grains in all directions, which facilitates their cooling against the cool sides of the granulator, and by contact with the air. The granulator may be cooled by directing blasts of cold air against the sides if desired, or it may be cooled by the ordinary methods of convection, in some circumstances. Furthermore, it may be constructed as vat 1 is constructed, with double walls for water cooling.

A small portion of raw, very finely powdered phosphate may be admitted to the granulator through the shaft 23 along with the finished product used for seeding so that the finely powdered material will act as a mist surrounding the granules and neutralize evolved acid vapors.

Each part of the equipment is tightly connected with the neighboring part so that the whole unit constitutes an enclosure into which a dry, cool draft of air is sent in order to favor the decrease of temperature of the material in the granulator particularly and to permit such minor amounts of nitrogen vapors as are evolved to be absorbed without escaping to the work room. In order to accomplish this, a drying tower 28, fitted with sulfuric acid, receives air from the pit 25 from which it is drawn by a blower 29 and forced through the tower 28. Alternatively, it may be partially exhausted to stack through valve 31 and pipe 46. The air forced through the sulfuric acid of the drying tower 28 may pass to stack through valve 32 or it may go through pipe 47 to the chute 26 and the screen 27 and from thence to pipe 40 and vat 1. From that vat it passes through the successive parts of the apparatus and back into the tower 28.

In Figs. 7, 9, 10, 11 and 12 is shown modified forms of apparatus for use with a mixture of oxygen or air and nitrogen oxides, this apparatus including an absorber 33 in which the absorption of the gaseous mixture takes place and which is connected by pipes 34 and 35 with the end of vat 1 opposite the overflow. The mass is circulated continuously through the vat and the absorber 33. The pipe 34 connected with compartment 1a of vat 1, which is not connected with compartment 1b through barrier 2, brings the fluid mass into the absorber and the pipe 35 carries it out. The absorber itself may constitute a U-tube in which the fluid goes down through one limb and up through the other while the gas is fed to the lower part of the tube connecting the two limbs. The limbs may be provided with bored or staggered plates or other division to improve the contact of the fluid mass and the gas. Alternatively, a fixed or rotating cylindrical casing may be provided in which a concentric cylinder is turned, helicoidal surfaces and paddles distributing and stirring the mass being provided on the surfaces, so that the mass is compelled to flow on the inside of the large cylinder and the outside surfaces of the small one to increase the contact between the gases and the fluid mass.

The examples herein given are designed to furnish a description of a practical method of carrying out the invention.

*Example 1*

This example describes the preparation of phospho-nitrate 4–16, corresponding to type 2 hereinabove. The operations are all carried out at atmospheric pressure. In the vessel 1, by agitation and cooling and by regulation of the quantity of reactants introduced, the temperature is contained within 35 degrees C. Generally speaking, there is no evidence of the freeing of fluorine or of nitric or nitrous vapors in that chamber. In the vessel 13 the temperature also remains in the neighborhood of 35 degrees C., whereas in granulator 18 the temperature is slightly lower and at the discharge orifice is found at about 30 degrees C.

The apparatus represented in Fig. 1 may be considered for the purposes of this example as having a vessel 1 of 6 cubic meters capacity, a vessel 13 of 1.2 meters diameter and 2 meters length, and a granulator 18 of 2.65 meters width and 4 meters length. Such an apparatus is capable of making 7 metric tons per hour of phospho-nitrate 4–16 under the following conditions:

There is introduced into the reaction chamber 1, continuously, the following quantities of materials per hour:

1582 kg. of nitric acid of 80% concentration;

3360 kg. of standard super-phosphate, the mode of preparation of which is recited in Example III hereinafter;

700 kg. of divided mono-calcium-phosphate, about 90% of which will pass through a screen of 900 openings per square centimeter.

The density of the fluid mass in the vessel 1 is about 1.6 and the weight of the fluid mass contained in it is about 9600 kg. Water is circulated in the exterior envelope and the temperature is kept at 35 degrees C. The material is discharged into the vessel 13 into which there is introduced 1470 kg. per hour of crushed Moroccan phosphate. The fluid mass coming from the vessel 1 and the crushed phosphate remain about five minutes in the vessel 13.

From the vessel 13 the material falls into the granulator 18 in which there is introduced additionally about 10,500 kg. per hour of the finished product. After remaining from 5 to 8 minutes the material issues at the extremity of the granulator at the rate of 17,500 kg. per hour of granulated phospho-nitrate of which the temperature is from 28 to 30 degrees C. and which analyzes:

18.4% total $P_2O_5$
16% soluble $P_2O_5$
4% nitrate nitrogen

The speed of passage of material indicated hereinabove may be varied in accordance with the concentration of the acids used and the nature of the finished product. The regulation of these speeds is of the first importance because at a particular stage of its manufacture, the product changes from fluid to a putty-like state in a very short time. When the material is cooled on a cold surface, this change occurs in about 30 seconds or less, and when granulation is carried out by seeding and agitation, in about a minute.

The 4–16 phospho-nitrate ages rather slowly and it may be that the silo 25 would have dimensions that are too great where manufacture is carried out on a large scale. Under such circumstances the silo 25 may be dispensed with and the finished product stored in the open air. After the finished product has returned to ambient temperature and hardened, portions of it can be taken from the heap and sent to the screen 27.

Another variation consists in replacing the silo 25 with a tubular screw conveyor such as is shown diagrammatically in Fig. 8 wherein the granulator 18 (or 50) discharges its product into the lower end of an inclined cylinder 55 interiorly furnished with a screw conveyor 56 which agitates the product and slowly moves it to the top of the screen housing 27. This screen housing 27 is installed on the ground and the finished product that is returned to the manufacturing process is lifted to the top of the vessel 1 by a suitable elevator. The remainder, separated by the screens into commercial size, is sent to storage. The screw conveyor 55 may conveniently be cooled by water applied exteriorly or by a draft of cold air applied interiorly.

Another variation in the apparatus is by constituting the column 28 as a refrigerator for cold air rather than as a desiccator, the cold air being circulated throughout the apparatus in the manner indicated in Fig. 1.

*Example II*

Figure 9:
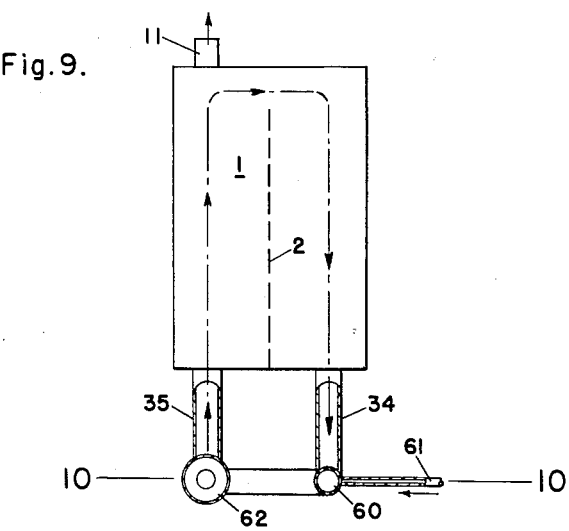
Fig. 9 is a diagrammatic horizontal view of one construction conforming to the modification of Fig. 7.
Figure 10:
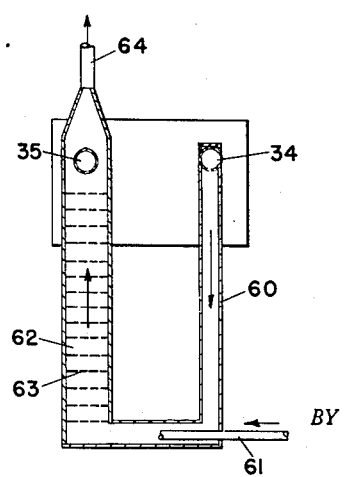
Fig. 10 is a diagrammatic vertical section on line 10—10 of Fig. 9.
Figure 11:
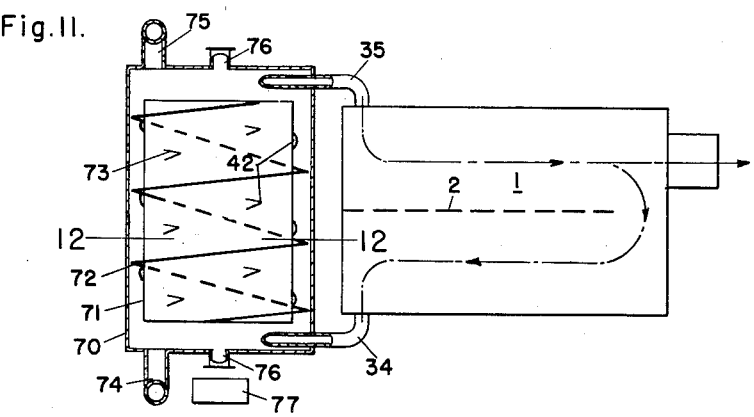
Fig. 11 is a horizontal section through another apparatus corresponding to Fig. 7.
Figure 12:
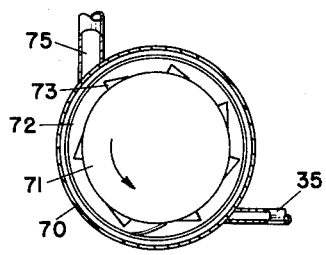
Fig. 12 is a vertical section on line 12—12 of Fig. 11.

The attack by nitric acid described in Example I is replaced in this instance by a mixture of oxygen (or air) and nitrogen oxide. This requires an alteration in the apparatus in which the primary reaction takes place in order to insure the absorption of the gases. This is diagrammatically indicated in Fig. 7 and in greater schematic detail in Figs. 9 to 12. Figs. 9 and 10 show a device of U tube construction and Figs. 11 and 12 show a device of spiral worm type. In the device of Figs. 9 and 10 tank 1 is connected on one side of the partition 2 by a pipe 34 to leg 60 of a U tube down which the products flow. At the bottom the U tube is served through a pipe 61 with nitrogen oxide gas. The other leg 62 of the U tube is of larger size than tube 60 and is furnished with perforated baffles 63 which insure the mixing and complete reaction of the gases with the phosphate. The fluid product passes back to the tank 1 through pipe 35 and gases are drawn off through pipe 64.

In the form shown in Figs. 11 and 12 the pipes 34 and 35 connect opposite ends of a cylinder 70, with a tank 1. The cylinder 70 is provided with a rotatable inner cylinder or drum 71 which is exteriorly provided with a worm 72 and a plurality of projecting fingers or scoops 73. The drum is of somewhat less diameter than the interior of the cylinder 70 but the screw is sufficiently in conformity with that dimension to insure the transference of the material from vat 1 and pipe 34 to pipe 35 and into the other side of vat 1. The reactive gas is admitted to the cylinder through pipe 74 and the spent gases are removed through pipe 75. The action of the rotating drum and the scoops 73 insures the transference of the phosphate throughout the space between the drum and the cylinder and insures the meeting of the gases and phosphate throughout a large surface of contact. The drum is mounted for rotation in bearings 76 and is driven by power applied through pulley 77. The helicoidal worm 72 not only insures the exposure of larger quantities of the phosphate to the gases but also serves to break and stir up the phosphate masses. The cylinder rotates rather slowly.

In any case where the gases exhausted through pipes 75 and 64 are not completely stripped of their reactive ingredients, they may be recycled.

When gases issuing from the catalytic oxidation of ammonia are employed the reaction mass is stirred up because the excess of air or of oxygen oxides NO to $NO_2$. Before submitting the gas to the absorption reaction, it is advantageous in this case to cool it to low temperature, for instance 0 degree C. or less. Then the $NO_2$ is transformed to $N_2O_4$ which is more reactive than $NO_2$. This accelerates the attack and increases the yield of the operation. When raw phosphate is attacked by nitric acid of 75% concentration the calcium nitrate crystallizes with a little more than two molecules of water alone. Therefore, with the gas provided by the oxidation of ammonia everything proceeds as though 75% nitric acid were being used, and there is obtained phosphonitrates that do not contain but a little more than two molecules of water per molecule of calcium nitrate, and consequently present a considerable reserve of dryness. The absorption of the gas described above has the additional effect of eliminating a part of the water contained in the gas, further contributing to increase the reserve of dryness of the manufactured product.

The transformation of mono-calcium phosphate to free phosphoric acid under the influence of nitrogen oxides is complete if the nitrogen oxide gases are in excess of those theoretically required to complete the reaction.

The process of this example proceeds as in Example I, except for the modification above described.

*Example III*

This example shows several methods of carrying out the attack of mixed nitric and sulfuric acids upon phosphates.

In plants that make superphosphate it is advantageous to set aside from the stock the super-phosphate necessary to the fabrication of phospho-nitrate, as pointed out in Example I hereinabove. On the other hand, instead of using standard super-phosphate of complete solubilization, it is advantageous in certain cases to use a super-phosphate of incomplete solubility.

The standard super-phosphate of practically complete solubility cited in Example I may be produced by the attack of sulfuric acid on raw Moroccan phosphate containing 33% $P_2O_5$, in the following proportions: 243 kg. sulfuric acid of 68% concentration to each 272 kg. of raw phosphate. This super-phosphate will contain about 18% of $P_2O_5$ soluble in water and ammonium citrate for each 18.7% of total $P_2O_5$.

One may also, in making super-phosphate, react sulfuric acid with a larger quantity of raw phosphate, for example, by using the following proportions: 243 kg. of sulfuric acid of 68% concentration to each 372 kg. of raw phosphate. There is thus obtained super-phosphate of incomplete solubility analyzing 22.8% total $P_2O_5$, of which only 14.8% is soluble.

In carrying out the reaction with the incompletely solubilized super-phosphate described above, 4060 kg. per hour of this super-phosphate may be introduced into the reaction vessel 1 in replacement of the mixture of raw phosphate and standard phosphate indicated in Example I. Under these conditions there is obtained a phospho-nitrate of the same composition as in Example I.

The incompletely soluble super-phosphate has the advantage that it may be produced in the phospho-nitrate workroom because the installation required for its manufacture is less complex and space consuming than that required for the manufacture of standard super-phosphate. However, whether the reaction is with standard super-phosphate completely solubilized or with the incompletely soluble super-phosphate, the super-phosphate may in either case be made in the vessel 1 itself by the introduction into this vessel of an appropriate quantity of sulfuric acid and of raw phosphate.

The employment of the sulfuric and nitric acids in mixture tends to give a violent reaction that prevents the easy maintenance of temperature below 35 degrees C. in reaction vessel 1. For this reason the process includes the separation of the two reactions by preference, the attack by sulfuric acid preceding the attack by nitric acid, that order being preferable to the inverse order.

There is interdependence in the concentration of the acids used because the total quantity of water admitted to the manufacture is determined in advance by the number of molecules of water of crystallization desired in the calcium nitrate. In Example I the standard superphosphate was attacked by nitric acid of 80% concentration. Having given the proportions of material required for the preparation of standard super-phosphate, the quantity of materials put in reaction in vessel 1 are, for example, 2604 kg. of raw phosphate, 1701 kg. of sulfuric acid of 68% concentration, and 1582 kg. of nitric acid of 80% concentration.

To obtain a fertilizer having the same water content one may utilize for example nitric acid of 64.5% with sulfuric acid in the following proportions: 2604 kg. of raw phosphate, 1484 kg. of sulfuric acid of 78%, 1736 kg. nitric acid of 64.5% concentration. Thus, by the selection of acid concentrations it is possible to introduce into the fertilizer the amount of water of crystallization desired in the final product.

*Example IV*

This example describes the manufacture of phosphonitrate by the attack of nitric acid on raw phosphate without the use of sulfuric acid or of super-phosphate and constitutes one of the most important phases of the invention. The apparatus used in this example is the same as in Example I and is employed for the manufacture of about 3.5 metric tons per hour of phosphonitrate 7.5–15 under the following conditions:

Into the reaction vessel 1 there is introduced 962 kg. per hour of finely divided Moroccan phosphate having 33% $P_2O_5$ and 1540 kg. of nitric acid of 80% concentration. The temperature is kept around 35 degrees by cooling as described in Example I. The material continually withdrawn into the mixer 13 is mingled with 1050 kg. per hour of raw Moroccan phosphate of the same kind. The material remains several minutes in mixer 13 and before it attains the putty state is granulated as described for the phosphonitrate 4–16, either by seeding with the finished product or by sharp cooling.

When the granulation is carried out by seeding there is added to the granulator 18 near the place of discharge from mixer 13 an amount of the finished product in granules through a pipe 23. The addition is made near the outlet from mixer 13 because of the rapidity with which the material assumes a putty-like consistency, being about a minute when a granulator 18 is employed.

When granulation by chilling is employed seeding is not necessary, but may be employed in tank 13 in close proximity to the outlet so that the product reaches the cooling cylinder before the product becomes putty-like.

The phospho-nitrate 7.5–15 obtained analyzes 19% total $P_2O_5$, 15.2% $P_2O_5$ soluble in water and citrate, and 7.6% nitrate nitrogen.

*Example V*

This example is for the purpose of describing granulation by submitting the fluid mass issuing from the agitator 13 to quick cooling. The apparatus for this purpose is shown in Fig. 13 and has been hereinabove described. The agitator 13 is provided with a very large discharge opening through which the material is discharged in a thin sheet upon the surface of the horizontal cylinder 50, which turns slowly. Within the cylinder a refrigerant circulates at −15 or −20 degrees C. and the discharge material solidifies almost instantly upon contact with the cylinder and is carried by it as a continuous attached sheet. The material after having travelled a little less than a complete revolution is detached from the cylinder by means of a doctor blade 52 and falls upon a belt conveyor that carries it to storage. The length of the discharge opening of mixer 13 is substantially equal to the length of the cylinder. The length of the cylinder, its diameter, and its speed of rotation are calculated in accordance with the rate of production desired, the nature of the fertilizer being manufactured and the intensity of the cooling. For example, for an hourly production of 3.5 metric tons of phospho-nitrate 7.5–15, such as described in Example IV, the discharge opening may be about 2 meters long, the cylinder about 2.1 meters long, and its diameter about 2 meters. It makes one revolution in about 25 seconds. The phosphonitrate sheet falling upon the cylinder is about 2 mm. in thickness. The complete solidification of the phosphonitrate takes about 15 to 20 seconds, when the nitric acid used for its fabrication is at 80 or at 72% concentration.

*Example VI*

When granulation is to be accomplished by seeding, that is, by return of a certain amount of the finished product, the method of operation described in Fig. 1 is followed in general. The granulation is obtained by projecting the semi-fluid mass against the wall of the granulator. Thus, the material discharged from mixer 13 enters the granulator 18 and is mingled there with finished products supplied through tube 23. This mixed mass is divided and formed into fine particles by the rotation of the paddles of the granulator and is projected into the air and against the sides of the granulator, both of which chill it to solidification in its granulated form. The finished product added to granulator 18 is preferably that which has gone through the finest screen of separator 27 and that which has been rejected by the coarsest screen and has been subsequntly crushed. If these quantities are too small they can be completed by the addition of particles of commercial size drawn from a stock. In France, the commercial sizes are considered to be of granules between 1 and 4 mm. in diameter.

*Example VII*

This example concerns the manufacture of fertilizer containing in addition to phospho-nitrate 4–16 salts of potassium and ammonia which are added in the course of manufacture. A mixture of ammonium nitrate and potassium sulfate is prepared in proportions such that 1 molecule of potassium sulfate is in the presence of 2 molecules of ammonium nitrate. The salts are crushed either before or after mixing. A reaction of double decomposition follows the equation:

$$2NH_4NO_3 + K_2SO_4 = 2KNO_3 + (NH_4)_2SO_4$$
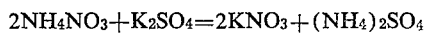

In very dry climates this reaction is facilitated by the addition of 1 to 3% water to the mixture of salts. The reaction of double decomposition takes about 2 to 3 days. The mixture of potassium nitrate and ammonium sulfate is introduced at the rate of 3920 kg. per hour into the mixer 13 during the manufacture of phospho-nitrate 4–16 as described, for example, in Example I. This addition is made in mixer 13 preferably near the extremity by which the product escapes to fall into granulator 18. After granulation a fertilizer is obtained analyzing:

10% $P_2O_5$ soluble in water and citrate;
10% $K_2O$;
5.6% nitrate nitrogen, and
3% ammoniacal nitrogen.

If it is desired to equalize the amounts of ammoniacal and nitrate nitrogen it is sufficient to introduce into the mixer 13 at the same time as the mixture of salts a supplementary quantity of ammonium sulfate or of ammonium phosphate.

*Example VIII*

This example describes the preparation of fertilizer by the addition of additional ingredients of fertilizer character to 7.5–15 phospho-nitrate in course of preparation. There is prepared a mixture containing by weight 12.5% of potassium sulfate of 59% $K_2O$ and 87.5% of a mixture of double decomposition salts prepared as in Example VII. The mixture thus obtained is introduced at the rate of 2240 kg. per hour into a vessel 13 during the course of the manufacture of phospho-nitrate 7.5–15 as described in Example VI. At the same time there is introduced in the vessel 13 700 kg. per hour of ammonium phosphate analyzing 20% ammonia and 50% soluble $P_2O_5$. This produces 6440 kg. per hour of fertilizer analyzing 15.7% total $P_2O_5$, 13.5% $P_2O_5$ soluble in water and citrate, 6.6% nitrate nitrogen, 4.7% ammoniacal nitrogen, and 10.8% $K_2O$.

A major advantage of this invention is that a granular fertilizer is produced without crushing and by the expenditure of an amount of power inconsiderable in comparison with that previously required.

Another advantage of the invention is that the loss of nitrogen gases from the reaction vessel is prevented by the new conditions under which the reaction is carried out.

A still further advantage is the method of employing nitrogen oxide gases in accordance with the principles of the invention to produce results superior to those heretofore obtained by the use of such gases.

Another advantage is in the production of granular fertilizer in convenient grain sizes by seeding and by chilling, both operations taking place in a very short period of time after the phospho-nitrate has been made and before it becomes putty-like.

Another advantage of the invention is in the apparatus and the process and their ability to produce a selected product in preselected degrees of hydration.

A further advantage is in the ease with which products containing other fertilizer ingredients in addition to phospho-nitrate can be produced.

The cooling of the apparatus is carried out not only by water cooling but by the circulation of conditioned air. The entire operation may be enclosed, producing a clean plant.

As many apparently widely different embodiments of the present invention may be made without departing from the spirit and scope thereof, it is to be understood that the invention is not limited to the specific embodiments, except as defined in the appended claims.

This application is a division of my co-pending case identified as Serial No. 748,010 filed May 14, 1947, now Patent No. 2,635,955 issued April 21, 1953.

What is claimed is:

1. Fertilizer manufacturing apparatus constructed and arranged for the reaction of phosphate rock, mineral acid, and the reaction product thereof, including an enclosed vat having an enclosed annular channel, means to admit rock and acid thereto, impeller means to circulate the mixture of rock, acid, and product through the channel, a second mixing vat having an enclosed channel connected to said first vat, conduit means associated with the second vat to mingle finely divided phosphate with the material from said first vat, impeller means to move the mixture through said channel, an enclosed outlet connecting said second vat with an enclosed granulating chamber, means to admit finely divided fertilizer to the material in the granulating chamber issuing from the second vat, agitator means to toss the mixture against the walls of the chamber, an enclosed outlet from said chamber, and means to flow air through said apparatus comprising a sulfuric acid air drier operatively connected on the dry air side to the first vat and on the moist air side to the granulating chamber.

2. Apparatus for the manufacture of fertilizer from phosphate of fertilizer grade comprising reaction vessels including an enclosed reaction vat having free space above the reaction mass, an enclosed mixer having free space above the mixed mass, an enclosed granulator having free space above the product, conduit means connecting the said reaction vessels permitting the passage of the reaction mass and of air from vessel to vessel, recycling means to return product to the said vat, and circulating gas drier means having conduit means operatively connecting the said free space of the granulator to the said free space of the vat including means to circulate air through the said apparatus concurrent with the flow of materials.

3. The apparatus of claim 2 in which the gas drier means is of sulfuric acid type.

4. Fertilizer manufacturing apparatus constructed and arranged for the reaction of natural phosphate, mineral acid, and the reaction product thereof, including an enclosed vat having a channel, means to admit rock and acid thereto, impeller means to circulate the mixture of rock, acid, and product through the channel comprising a vertically directed stirrer positioned in said channel, a second vat having an enclosed channel, conduit means connecting the first and second vats, means to mingle finely divided phosphate with the material discharged from said conduit, means to move the mixture through said channel comprising a horizontally directed stirrer position in said channel, conduit means connecting said second vat with an enclosed granulating chamber, means to admit finely divided fertilizer to the material issuing from said second vat, agitator means to toss the mixture against the walls of the chamber, conduit means conducting the material to an enclosed storage chamber, an enclosed duct for material extending from said chamber to an enclosed screen, an enclosed duct for material extending from the fine side of the screen to the first vat, and means to flow air throughout said apparatus concurrent with the flow of material through the apparatus comprising a sulfuric acid air drier operatively connected between said duct and storage chamber by conduit means and air impelling means.

5. Fertilizer manufacturing apparatus constructed and arranged for the reaction of fertilizer grade raw materials including an enclosed vat having an enclosed annular channel provided with inlet and discharge ports, means to circulate such raw materials through the channel comprising a weir across the channel and a vertically directed stirrer positioned in said channel adjacent and upstream of said weir, said discharge port being in the channel downstream of said weir, a circulating sulfuric acid air drier operatively connected to the vat by conduit means for the circulation of air therethrough, a source of fine phosphatic material connected to said conduit means, and means to cycle air and fine phosphatic material through said conduit means through said enclosed vat and through said drier concurrently with the flow of material through the apparatus.

6. Apparatus for fertilizer manufacture comprising a first reaction vat having means to move its contents in a stream, means to admit solids to the stream, means to admit liquids downstream of said solids admitting means, a second mixing vat having means to receive the product of the first vat, means to admit solids to the second vat, means to agitate the contents of the second vat, discharge means in said second vat, a granulator having means to receive the discharge from said means and having material discharge means, a store pit having means to receive the material ejected from said granulator, conduit means connecting the several pieces of apparatus for continuous flow of the material, a drier for gases, said vats and pit being enclosed and interconnected for the circulation of air, and means to circulate air from drier through the apparatus from the first vat to the store pit, and from the store pit to the drier.

7. Closed apparatus for the making of fertilizer comprising a reaction vessel, a mixer, a granulator and an air drier in interconnected closed series, and duct means to circulate air through the said apparatus concurrent with the flow of materials, the reaction vessel having a ring shaped channel through which the contents may be circulated, a barrier across the channel, an upwardly directed impeller to move the material on one side of the barrier to the other side, a passage in the lower part of the barrier, and means to enlarge and restrict the passage whereby to regulate the flow of the material in the channel.

8. Closed apparatus for the making of fertilizer comprising a reaction vessel, a mixer, a granulator and an air drier in interconnected, closed series, and duct means to circulate air through the apparatus concurrent with the flow of materials, the reaction vessel having a channel through which the contents may be moved, a barrier across the channel, and an upwardly directed impeller adjacent the barrier to move the material on one side of the barrier to the other side.

9. Closed apparatus for the making of fertilizer comprising a reaction vessel, a mixer, a granulator and an air drier in interconnected closed series and duct means to circulate air through the apparatus, the reaction vessel having a channel through which the contents may be circulated, and a barrier across the channel.

10. Closed apparatus for the making of fertilizer comprising a reaction vessel, a mixer, a granulator and an air drier in interconnected closed series and duct means to circulate air through the apparatus, the reaction vessel having a channel and means for regulating the flow of fluid in the channel comprising a barrier obstructing the channel and means to elevate the material on one side of the channel to a position such that it flows over the barrier.

11. Closed apparatus for the making of fertilizer comprising a reactor, a mixer, and a granulator in interconnected, closed series with an air drier, and duct means to circulate air through the apparatus, the reaction vessel having a channel and means for regulating the flow of fluid in the channel comprising two barriers across the stream, means to admit the fluid stream past one barrier to the space between the barriers, and means to elevate the fluid between the barriers to a position such that it flows over the second barrier.

12. Apparatus for fertilizer manufacture comprising a first chamber and a channel therein, means to admit reactants to the said chanenl, impeller means to move the reactants along the channel in a stream, means downstream of said admitting means to admit further reactants to the stream, a second chamber connected to the first chamber by an overflow in said channel, the connection between said chambers being gas tight, means to admit reactants to the second chamber near the said connection, impeller means to agitate the contents of the second chamber and to move them to a discharge point, a third chamber connected to said second chamber by an air tight connection, granulating means in the third chamber, a storage chamber connected to said third chamber by an air tight connection, an air tight recycling conduit extending from the storage chamber to the first chamber, conveyor means in said conduit, a gas drying chamber connected by air-tight connections to said first chamber and said recycling conduit, and air circulating means in one said connection operable to move the dry air from said dryer through the said apparatus in the same direction as the flow of the reactants.

13. A train of apparatus useful in fertilizer manufacture comprising a reaction vessel, a mixing vessel connected to said reaction vessel, a granulator connected to said mixing vessel, recycling means connected to said granulator and to said reaction vessel, an air drier connected at its output side to the recycling means and at its inlet side to the granulator, impeller means to flow reactants from vessel to vessel in said train from the reaction vessel to the recycling means, and air circulating means acting to flow air through the said train of apparatus concurrent with the flow of reactants.

References Cited in the file of this patent

UNITED STATES PATENTS

| | | |
|---|---|---|
| 709,185 | Terne | Sept. 16, 1902 |
| 1,938,533 | Penfield | Dec. 5, 1933 |
| 2,015,384 | Nordengren | Sept. 24, 1935 |
| 2,017,027 | Forrest | Oct. 8, 1935 |
| 2,069,731 | Trumpler | Feb. 2, 1937 |
| 2,433,070 | Sparks et al. | Dec. 23, 1947 |

FOREIGN PATENTS

| | | |
|---|---|---|
| 458,478 | Great Britain | Dec. 21, 1936 |